US00RE47555E

(19) United States
(12) Reissued Patent
Widen

(10) Patent Number: US RE47,555 E
(45) Date of Reissued Patent: *Aug. 6, 2019

(54) PROFILED KEY FOR CYLINDER LOCKS

(71) Applicant: WINLOC AG, Zug Schweiz (CH)

(72) Inventor: Bo Widen, Torshalla (SE)

(73) Assignee: WINLOC AG, Zug Schweiz (CH)

( * ) Notice: This patent is subject to a terminal disclaimer.

(21) Appl. No.: 14/677,452

(22) Filed: Apr. 2, 2015

Related U.S. Patent Documents

Reissue of:
(64) Patent No.: 8,205,473
Issued: Jun. 26, 2012
Appl. No.: 13/080,339
Filed: Apr. 5, 2011

U.S. Applications:
(62) Division of application No. 12/866,204, filed as application No. PCT/SE2010/050189 on Feb. 18, 2010, now Pat. No. 8,210,009.

(30) Foreign Application Priority Data

Feb. 18, 2009 (SE) ..... 0900207
Jan. 4, 2010 (WO) ..... PCT/SE2010/050006

(51) Int. Cl.
*E05B 19/06* (2006.01)
*E05B 19/00* (2006.01)
*E05B 27/00* (2006.01)

(52) U.S. Cl.
CPC ..... *E05B 19/0029* (2013.01); *E05B 27/0078* (2013.01); *E05B 27/0082* (2013.01);
(Continued)

(58) Field of Classification Search
CPC ..... Y10T 70/7605; Y10T 70/7859; Y10T 70/7864; Y10T 70/7881
(Continued)

(56) References Cited

U.S. PATENT DOCUMENTS 4,638,651 A 1/1987 Surko, Jr.
4,683,740 A 8/1987 Errani
(Continued)

FOREIGN PATENT DOCUMENTS

DE 44 22 093 C2 * 1/1996
DE 44 32 571 B4 7/2005
(Continued)

OTHER PUBLICATIONS

Verified English language translation of WO 01/96696, 7 pgs.*
(Continued)

*Primary Examiner* — Robert M Fetsuga
(74) *Attorney, Agent, or Firm* — Birch, Stewart, Kolasch & Birch, LLP

(57) ABSTRACT

A key for use in a cylinder lock with a rotatable key plug having an elongated key blade with a relatively wide lower portion and a relatively narrow upper portion. A step-like transition region between the wider lower portion and the narrow upper portion. The key blade includes a longitudinal profile groove located adjacent to the step-like transition region that extends along at least a portion of the length of the blade. An inner wall of groove is substantially parallel to a side surface of the lower portion of the key blade. The longitudinal profile groove includes an undercut portion adjacent to and inside a ridge portion of the key blade. The outside of ridge portion forms apart of the side surface of the blade in the relatively wide lower portion up to the step-like transition region and the inside of ridge portion facing inner wall of the groove.

27 Claims, 6 Drawing Sheets

AMENDED

(52) U.S. Cl.
CPC ..... *Y10T 70/7588* (2015.04); *Y10T 70/7605* (2015.04); *Y10T 70/7616* (2015.04); *Y10T 70/7627* (2015.04); *Y10T 70/787* (2015.04); *Y10T 70/7859* (2015.04); *Y10T 70/7864* (2015.04); *Y10T 70/7881* (2015.04)

(58) Field of Classification Search
USPC ..... 70/493, 405, 406, 409
See application file for complete search history.

(56) References Cited

U.S. PATENT DOCUMENTS

| | | | | |
|---|---|---|---|---|
| 4,756,177 | A | 7/1988 | Widen | |
| 4,815,307 | A | 3/1989 | Widen | |
| 5,640,865 | A | 6/1997 | Widen | |
| 5,715,717 | A | 2/1998 | Widen | |
| 5,809,816 | A * | 9/1998 | Widen | 70/493 |
| 5,845,525 | A * | 12/1998 | Widen | 70/493 |
| 6,134,929 | A | 10/2000 | Widen | |
| 6,851,292 | B2 | 2/2005 | Kruhn | |
| 7,159,424 | B2 * | 1/2007 | Widen | 70/409 |
| 7,370,502 | B2 | 5/2008 | Widen | |
| 7,487,653 | B2 * | 2/2009 | Widen | 70/409 |
| 7,665,336 | B2 * | 2/2010 | Widen | 70/409 |
| 7,665,337 | B1 | 2/2010 | Widen | |
| 7,788,956 | B2 | 9/2010 | Field et al. | |
| RE46,878 | E * | 5/2018 | Widen | E05B 19/0029 |
| 2008/0196461 | A1 | 8/2008 | Widen | |
| 2008/0250830 | A1 | 10/2008 | Field et al. | |

FOREIGN PATENT DOCUMENTS

| | | | |
|---|---|---|---|
| EP | 1 835 096 | A1 | 9/2007 |
| WO | WO 01/96696 | A1 * | 12/2001 |
| WO | WO 2005/028789 | A1 | 3/2005 |
| WO | WO 2005/028789 | A1 * | 9/2007 |

OTHER PUBLICATIONS

Partial Machine Generated Translation of WO 01/96696A1 (claims and description of the drawings). This reference was previously cited in the present application on Apr. 2, 2015.
Office Action issued in corresponding U.S. Appl. No. 14/677,496 dated Jan. 17, 2017.
Office Action issued in related U.S. Appl. No. 14/677,496 dated Mar. 17, 2016.
U.S. Patent and Trademark Office, "Final Office Action," issued in connection with U.S. Appl. No. 14/677,496, dated Sep. 19, 2017.

* cited by examiner

AMENDED PRIOR ART

AMENDED PRIOR ART

AMENDED PRIOR ART

AMENDED

AMENDED

AMENDED
Fig 6
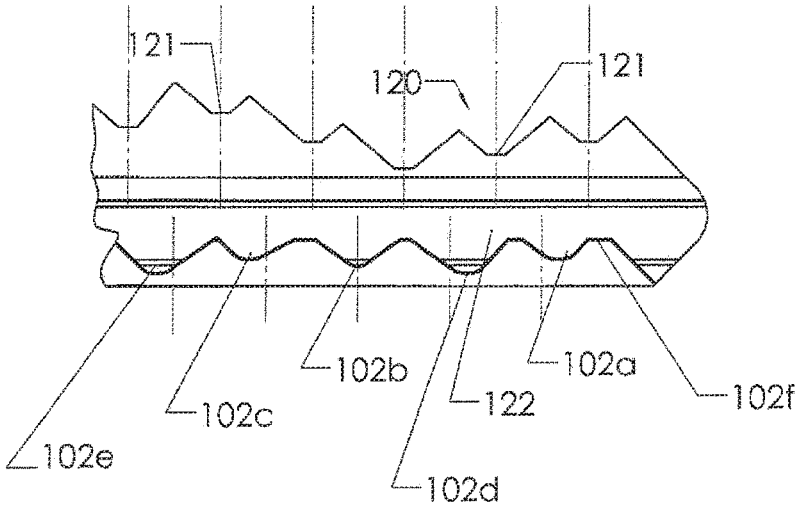
AMENDED
Fig 7
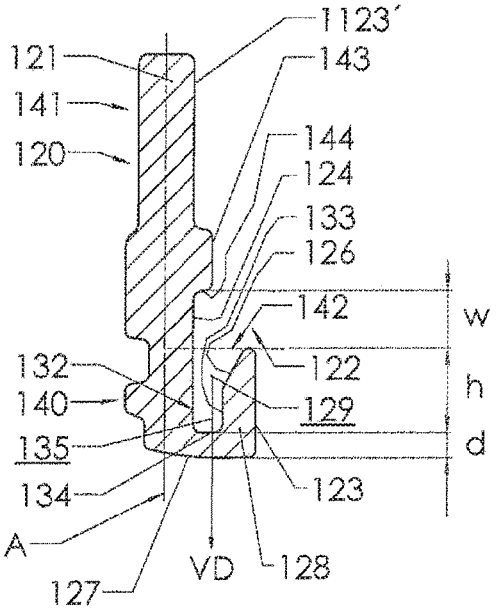

AMENDED
Fig 10
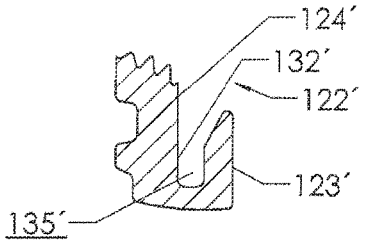
AMENDED
Fig 11
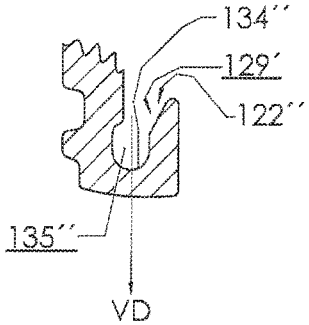
AMENDED
Fig 12
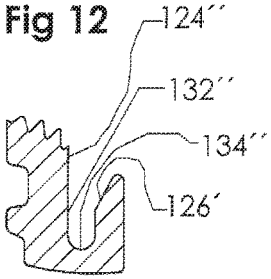
AMENDED
Fig 13
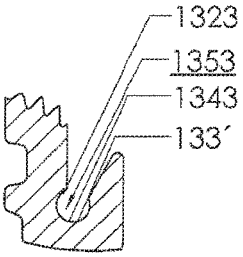
AMENDED
Fig 14
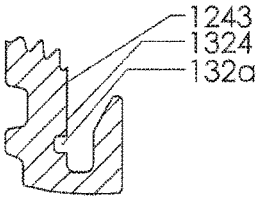
AMENDED
Fig 15
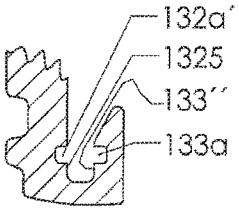
AMENDED
Fig 16
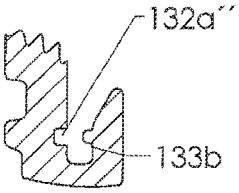
AMENDED
Fig 17
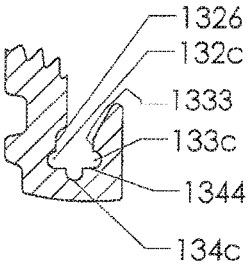

AMENDED
Fig 18
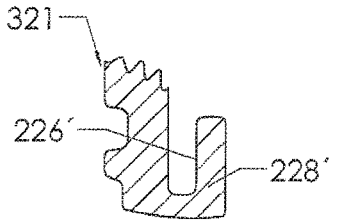
AMENDED
Fig 19
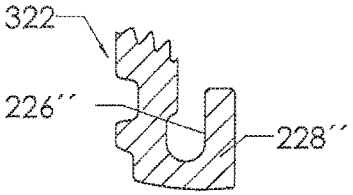
AMENDED
Fig 20
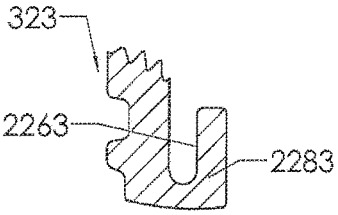
AMENDED
Fig 21
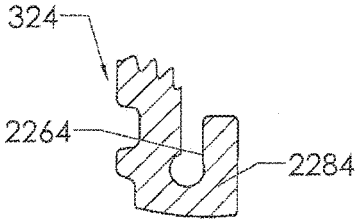
AMENDED
Fig 22
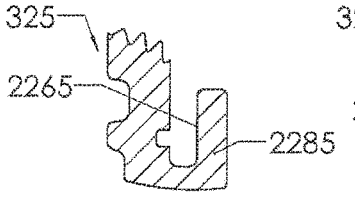
AMENDED
Fig 23
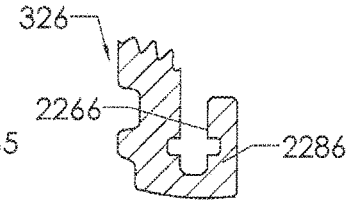
AMENDED
Fig 24
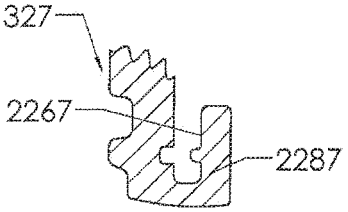
AMENDED
Fig 25
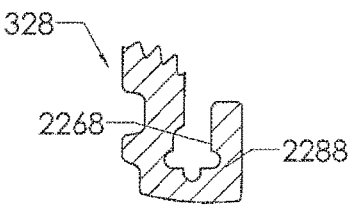
AMENDED
Fig 26
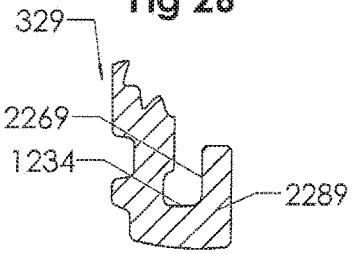

PROFILED KEY FOR CYLINDER LOCKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application is a Divisional of co-pending application Ser. No. 12/866,204, filed on Aug. 4, 2010, the entire contents of which are hereby incorporated by reference and for which priority is claimed under 35 U.S.C. § 120.]

*CROSS-REFERENCE TO RELATED APPLICATIONS*

*The present application is a reissue of U.S. application Ser. No. 13/080,339 filed on Apr. 5, 2011, now U.S. Pat. No. 8,205,473 B2 issued on Jun. 26, 2012, which is a Divisional Application of U.S. application Ser. No. 12/866,204 filed on Aug. 4, 2010, now U.S. Pat. No. 8,210,009 B2 issued on Jul. 3, 2012, which is a National Phase of PCT Patent Application No. PCT/SE2010/050189 filed on Feb. 18, 2010, which claims priority to an earlier filed PCT Patent Application No. PCT/SE2010/050006 filed on Jan. 4, 2010 and to Swedish Patent Application No. 0900207-2 filed on Feb. 18, 2009.*

FIELD AND BACKGROUND OF THE INVENTION

The present invention relates to a key for use in a cylinder lock with a rotatable key plug having a profiled key hole or keyway, said key comprising:

an elongated key blade with a relatively wide lower portion and a relatively narrow upper portion, there being a step-like transition region between the wider lower portion and the narrow upper portion, said key blade having a longitudinal profile groove located adjacent to said step-like transition region and extending along at least a portion of the length of the key blade, with an inner wall of said groove being substantially parallel to a side surface of said lower portion of said key blade, said longitudinal profile groove having an undercut portion adjacent to and inside a ridge portion of the key blade, the outside of said ridge portion forming a part of said side surface of the key blade in said relatively wide lower portion up to said step-like transition region, and the inside of said ridge portion facing said inner wall of said groove.

Such a key with an undercut groove is previously known, e.g. from U.S. Pat. No. 5,715,717 (Widén) or U.S. Pat. No. 5,640,865 (Widén). Such keys have proven to be very useful in that they provide an improved security. The key profile is quite distinguished from conventional keys, and it is rather difficult to copy such keys. Moreover, they permit a great variation of the cross-sectional profile, which is a great advantage.

OBJECT OF THE INVENTION

However, over time, there is a constant need for further distinguishing profiles and many more possible variations thereof.

A further object of the invention is to make it even more difficult to copy such profiled keys with ordinary lock smith tools.

SUMMARY OF THE INVENTION

In order to achieve these objects, the undercut portion of the longitudinal profile groove, at its innermost part inside said ridge portion, is extended or expanded downwardly, preferably substantially in a direction in parallel to said side surface of the key blade, into a longitudinal pocket having opposite lateral wall portions and a lowermost transverse end wall, which is substantially flat or slightly curved, and which is substantially parallel to a lower edge portion of the key blade and faces upwardly in a direction in a central plane of the key blade.

The inside wall of the ridge portion may be substantially parallel to a side surface of the key blade, so that the ridge portion forms a massive and strong material portion extending in parallel to the side surface of the key blade. The pocket inside the ridge portion may have a substantially rectangular cross-section, a substantially circular cross-section, with a relatively large curvature, or some other configuration.

In this way, the material of the key blade is used in an optimum way, and a new kind of profile is obtained, and it will be very difficult to copy such keys, especially if they are produced by stamping and milling. A cutting disc is normally not enough. Rather, it may be necessary to use broaching tools and a well-controlled use of such tools in order to secure exact dimensions of the pocket-like extension of the groove. This is of great importance for key control and high security to the end user of the key.

With such a configuration of the undercut groove, many advantages are obtained at the same time, as will be explained further below.

Other preferable features are stated in the dependent claims and will appear from the detailed description below.

BRIEF DESCRIPTION OF THE DRAWINGS

The invention will be described more fully below with reference to the appended drawings.

FIG. 6 shows a side view of a profiled key according to the present invention for an embodiment with a wave-like code pattern;

FIG. 7 is a cross-section through the key of FIG. 6;

FIGS. 10-17 are cross-sectional views of some additional embodiments of the profiled key according to the invention (the upper part of the key being taken away), and FIGS. 18-26 are similar cross-sectional views of some further modified embodiments of the profiled key according to the invention.

BRIEF DESCRIPTION OF SOME PREFERRED EMBODIMENTS

Figure 1:
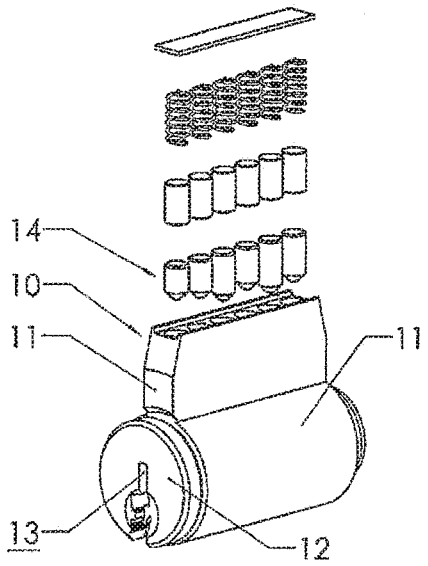
FIG. 1 and FIG. 2 illustrate a prior art lock and key combination.
Figure 2:
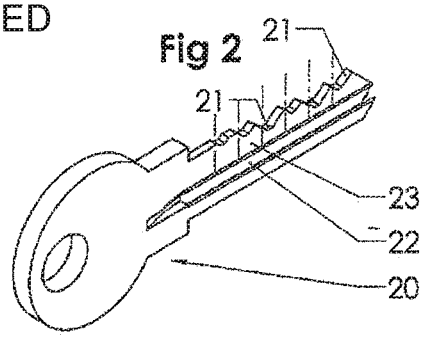
Figure 3:
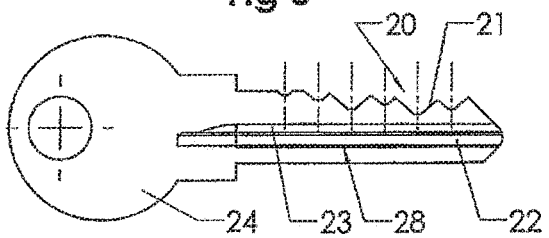
FIG. 3 shows a side view of the key illustrated in FIG. 2.

FIGS. 1 through 5 show a prior art lock and key system with a key blade having an undercut profile groove in a side surface thereof, such as the system disclosed in U.S. Pat. No. 5,715,717 (Widén). The lock 10 is of the kind having a housing 11 with *locking pins 14 in an upper portion thereof and* a rotatable key plug 12 accommodated in a cylindrical bore of the housing. In the key plug 12, there is a central longitudinal keyway or key hole 13 having a sectional profile corresponding to an associated key 20 provided with conventional recesses 21 at the upper edge thereof and a profile groove 22 at a side surface 23 of the key blade. As appears from FIG. 3, the key also has a grip portion 24.

Figure 4:
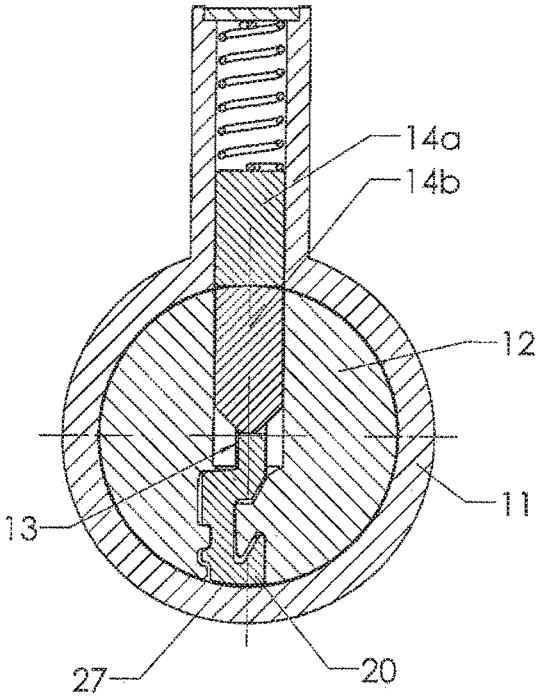
PRIOR ART Fig 4
FIG. 4 is a cross-section through the prior art lock with an inserted key.

The operation of the lock is more readily understood from the cross-sectional view in FIG. 4. The key plug 12 is rotatable within the housing 11 and can be locked against rotation by means of a longitudinal row of upper and lower locking pins 14a, 14b. Each pair of such locking pins can be positioned with their abutting end surfaces at the shear line between the key plug 12 and the housing 11. In this position, as shown in FIG. 4, the key plug 12 is rotatable. Here, as is well-known in the art, the locking pins are positioned so as to release the lock by means of a properly cut key 20.

Figure 5:
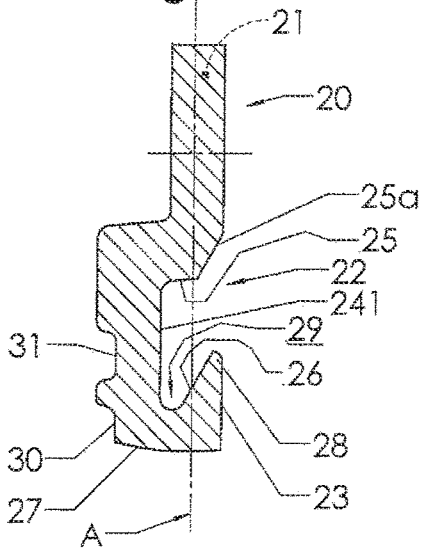
PRIOR ART Fig 5
FIG. 5 is a cross-sectional view of the prior art key blade.

The full profile of the key 20 (of prior art design) is illustrated in FIG. 5, as disclosed e.g. in the above-mentioned U.S. Pat. No. 5,715,717 (Widén). Accordingly, this prior art key has a longitudinal profile groove 22 extending longitudinally along the key blade at a depth which is slightly greater than half the thickness of the key blade. In FIG. 5, [the central] *a* plane of the key blade is denoted *by the letter* "A". The longitudinal groove 22 has an inner wall [24] *surface 241* and [opposite walls] *upper wall surface* 25 and *lower side wall surface* 26. *An inclined portion 25a extends upwardly from the upper wall surface 25.* One of [these opposite walls] *the wall surfaces*, in particular the *lower side* wall [or] surface 26 located closest to the base edge 27 of the key blade[,] is undercut and extends in a plane being inclined so as to face inwardly towards [the] inner wall [or] surface [24] *241*. This lower side wall *surface* 26 of the undercut groove 22 forms an inside wall *surface* of a ridge portion 28, the outside of which forms part of the above mentioned side surface 23 of the key blade.

The prior art key blade shown in FIGS. 2,3, 4 and 5 also has two further longitudinal grooves 30 and 31 on the other side of the key (to the left in FIG. 5).

The undercut portion 29 of the longitudinal groove 22 has many advantages, as explained in the above-mentioned U.S. Pat. No. 5,715,717 (Widén), especially with regard to increasing the number of possible profile variations, improved resistance against picking the lock and high security against unauthorized key copying.

According to the present invention and as illustrated in FIG. 6 through 9, a further improvement resides in a modification of the undercut groove. This modification comprises an expansion or extension of the innermost part of the undercut portion of the groove 122 (FIG. 7) so as to form a longitudinal pocket-like configuration 135.

[In FIG. 7, all reference numerals relating to the key correspond to those shown in FIG. 5, although they have been supplemented with the digit "1" before the number given in FIG. 5.]

Also, in the embodiments shown in FIGS. 6-9, [the] *a one piece* key blade 120 has a relatively wide lower portion 140 and a relatively narrow upper portion 141, there being a shelf or step surface 142 in the transition [region] between the wider lower portion 140 and the narrow upper portion 141. *The wider lower portion extends farther in a lateral direction relative to the narrow upper portion to form a step-like transition.* The longitudinal profile groove 122 is located adjacent to this shelf surface 142. This structure with a shelf or step surface is previously known per se.

[The] *As illustrated in FIG. 7, the* downwardly extended pocket-like configuration 135 of the modified undercut groove 122, is (in this particular embodiment) substantially rectangular in cross-section, with opposite lateral walls 132 and 133 being parallel to each other, and a lowermost transverse end wall 134, being parallel to the lower edge surface 127 of the *one piece* key blade and facing upwardly in the direction of the [central] plane A of the *one piece* key blade. *The one piece key blade 120 has the step-like transition formed by an external side wall surface 123 at the lower part of the one piece key blade 120 that is in a plane which is parallel to an upper side surface 1123' of the one piece key blade 120 at an upper part thereof, above said longitudinal profile groove 122. The lowermost transverse end wall 134 of the pocket 135 faces upwardly in a direction opposite to a vertical direction (VD) towards an upper wall surface 144 that is formed by a projecting surface 143 on the upper side surface 1123'.*

The [innermost] *inner* lateral wall *surface portion* 132 of the pocket-like extension 135 adjoins [with the] *and merges with the* inner wall *surface* 124 of the undercut groove *122*, so whereas the opposite *outer* lateral wall *surface portion* 133 forms the inside wall *surface* of the ridge portion 128, in parallel to the external side *wall* surface 123 of the key blade.

Thus, the surfaces 123, 133 and 132 are substantially parallel to each other. *The one piece key blade 120 includes an undercut portion 129 of the longitudinal profile groove 122 which, at an innermost part, is extended further substantially in the same direction as the vertical direction (VD) into a longitudinal, substantially uniformly wide pocket 135 having a uniform width with opposite inner and outer substantially parallel lateral wall surface portions 132, 133. The undercut portion or longitudinal profile groove 122 is defined at an upper part thereof by a smallest opening width (w), as seen perpendicularly to the external side wall surface 123 of the lower portion of said one piece key blade 120 between an upper wall 144 and the ridge portion 128. The vertical dimension (h) of the ridge portion 128 is equal to or greater than half of said smallest opening width (w). The inner wall surface 124 of said longitudinal profile groove 122 is located at a distance from the external side wall surface 123 of the one piece key blade 120 which is greater than half the thickness of the one piece key blade 120.*

*According to a first aspect of the invention, the undercut portion 129 of the longitudinal profile groove 122, at an innermost part, is extended further substantially in the same direction as the vertical direction (VD) into a longitudinal substantially uniformly wide pocket 135 having a uniform width with opposite inner and outer substantially parallel lateral wall surface portions 132, 133 wherein the inner wall surface 124 of the longitudinal profile groove 122 adjoins the inner lateral wall surface portion 132 of the pocket 135. The inner lateral wall surface portion 132 of the pocket 135 extends downwardly to a lowermost transverse end wall surface 134, which is substantially flat or slightly curved, and which is substantially parallel to a lowermost edge wall surface 127 of the one piece key blade 120 and which faces upwardly in a direction opposite to the vertical direction (VD) towards the upper wall surface 144 of the longitudinal profile groove 122 with the opposite lateral wall surface portions 132, 133 of the pocket 135 being substantially parallel to the external side wall surface 123 of the one piece key blade 120.*

*According to a second aspect of the invention, the undercut portion 129 of the longitudinal profile groove 122, at an innermost part, is expanded downwardly into a longitudinal widened pocket 1353 having a larger width relative to the longitudinal profile groove 122. The longitudinal widened pocket is formed by opposite inner and outer lateral wall surface portions and the inner lateral wall surface portion 1323 of the longitudinal profile groove 122 is connected to the inner wall surface of the longitudinal profile groove 122. The lowermost transverse end wall surface 1343 faces upwardly in a direction opposite to the vertical direction (VD) towards the upper wall surface 144 of the longitudinal profile groove 122 and at least a part of one of said opposite lateral wall surface portions of the longitudinal widened pocket 1353 is a circular arc. The longitudinal widened pocket 1353 extends downwardly in the same direction as the vertical direction (VD) of said undercut portion 129.*

*According to a third aspect of the invention, the undercut portion 129 of the longitudinal profile groove 122, at an innermost part is extended further substantially in the same direction as the vertical direction (VD) into a longitudinal pocket 135 being interrupted by at least one longitudinal recess formed in at least one of opposite inner and outer lateral wall surface portions 132, 133 wherein the inner wall surface 1243 of the longitudinal profile groove 122 adjoins the inner lateral wall surface portion 1324, located opposite to the ridge portion. The inner lateral wall surface portion 1324 extends downwardly to a lowermost transverse end wall surface 134, the lowermost transverse end wall surface 134 being substantially flat or slightly curved, and being substantially parallel to a lowermost edge wall surface 127 of the one piece key blade 120 and which faces upwardly in a direction opposite to the vertical direction (VD) towards the upper wall surface 144 of the longitudinal profile groove 122 with the opposite lateral wall surface portions 132, 133 of the pocket 135 being substantially parallel to the external side wall surface 123 of the one piece key blade 120.*

The ridge portion 128 is somewhat longer, measured in parallel to the [central] plane A of the key blade, than the prior art structure (FIG. 5) and reaches up to the step-like transition region 142. More particularly, the ridge portion 128 has a vertical dimension h, which is more than half of the smallest *opening* width w of the undercut groove 122, this smallest *opening* width w being measured as a perpendicular projection onto the inner wall 124 of the longitudinal groove 122. Also, *preferably,* the vertical dimension h of the ridge portion 128 is greater than the distance d between the lowermost transverse end wall 134 and the lower edge surface 127 of the key blade. *In this embodiment, the vertical dimension h of the ridge portion 128 is equal to or greater than the smallest opening width w.* This structure is advantageous for several reasons:

- by varying the width, depth (in the plane A) and longitudinal extension of the pocket-like configuration, the profile shape can be varied considerably;
- because of the opposite lateral wall portions 132, 133 the total width of the undercut portion of the profile groove 122 can be accommodated in a limited region laterally, so that the total width of the key blade can be kept rather small. It appears from FIGS. 5 and 7 that the total width of the new key blade is about the same;
- the corresponding tongue portion, which may form a part of a longitudinal rib 150 at a side wall of the key way (see FIGS. 8 and 9), will be stronger and does not have to have a pointed or sharp end portion, as in the prior art structure (compare FIG. 4);
- the pocket-like extension 135 of the undercut portion of the groove 122 will make it much more difficult to make copies of such keys, since it may not be sufficient to use only a cutter disk. Normally, other tools also have to be used. Accordingly it will be difficult for others than specialized manufacturers to produce such key blanks;
- the relatively long vertical extension of the ridge portion 128, in parallel to the [central] plane A of the key blade, will make it possible to cut rather deep recesses in the ridge portion. Accordingly, just like in the prior art embodiment of FIGS. 1-5, it is possible to provide many vertical levels of code recesses in this material region, see FIG. 6. Of course, this will also facilitate lock and key systems having a very high number of code combinations.

Figure 8:
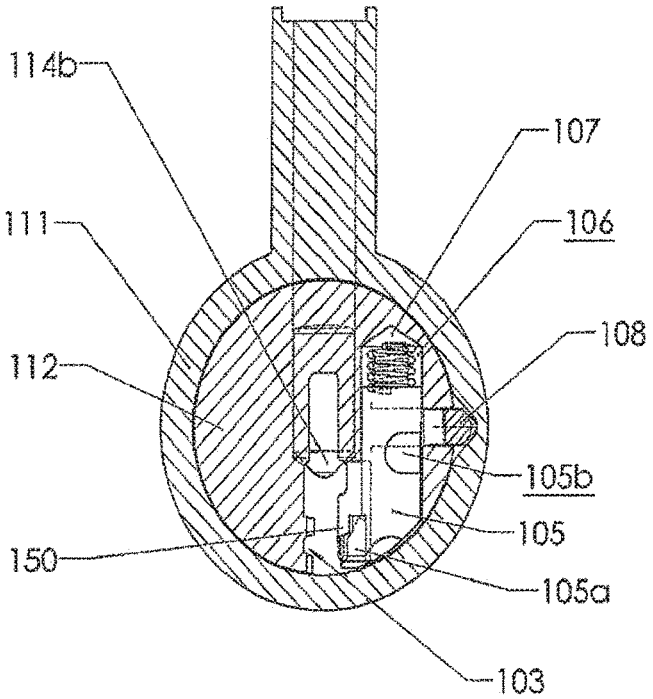
FIG. 8 is a cross-section through an associated lock with a key plug and a side tumbler.
Figure 9:
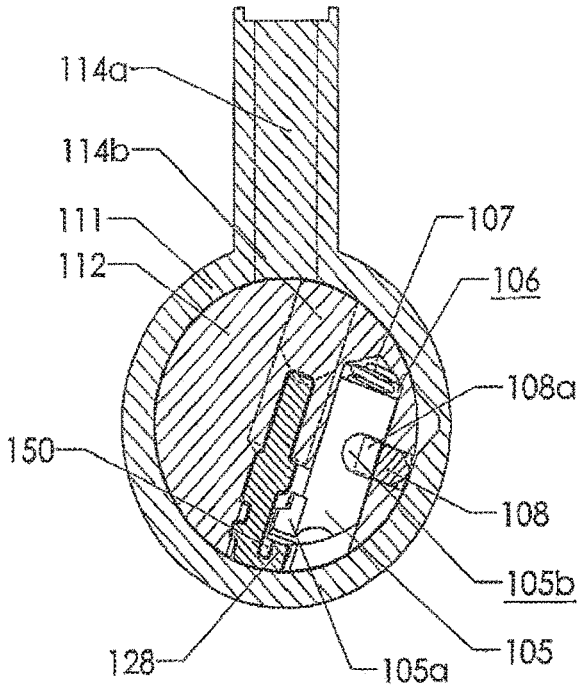
FIG. 9 is a similar view of a lock and an inventive key inserted into the lock.

In FIGS. 8 and 9 there is shown an embodiment with a side locking tumbler 105, which is guided in a cylindrical cavity 106 in the rotatable key plug 112. In principle, the arrangement is similar to those disclosed in the U.S. Pat. Nos. 4,756,177 (Widén) and 5,715,717 (Widén).

[The parts that correspond to the previous, prior art embodiment (FIG. 5) have been given the same reference numerals, with the digit "1" added before the numbers shown in FIG. 5.]

Accordingly, the side tumbler 105 is (in this embodiment) rotatable around its cylindrical axis, so that a transversally projecting finger 105a will pivot back and forth when the projecting finger 105a follows a wave-like coded surface on the side of the key blade (see FIG. 6), in this case in the ridge portion 128 (see FIG. 7). When the side tumbler 105 is correctly positioned, a recess 105b in its cylindrical surface will register with corresponding projections 108a on a side bar 108 (FIG. 9). In this way, the side bar may move radially inwards so as to permit rotation of the key plug 112.

The projecting finger 105a on the side tumbler 105 will contact the wave-like code pattern on the side of the key blade 120, as shown in FIG. 6, while pivoting back and forth and also moving vertically up and down. When the key blade is fully inserted, the various side tumbler projections 105a will be located in the concavities 102a, 102b, 102c, 102d, 102e and possibly also (or alternatively) onto an upper code surface portion 102f at an uppermost extra code level. Such an upper, extra code level is disclosed in the published international patent application WO2005/028789 (Winloc et al).

It would be possible to provide an even deeper pocket-like extension 135 of the undercut portion of the profile groove, in parallel to the [central] vertical plane A of the key blade. Then, the number of possible code levels in the ridge portion [133] *128* (see [FIGS. 6 and] *FIG.* 7) would be larger than in prior art structures.

It should be noted that the new configuration of the undercut groove 122, with the pocket-like extension 135, is useful even without having a side tumbler 105. Then, the ridge portion is basically continuous and does not have any cuts or codes.

Also, if at least one side tumbler is used, it does not have to be rotatable, but can be guided for elevational movement only. Furthermore, the side tumbler does not have to operate as a locking means for locking the key plug against rotation. Alternatively, it may serve only as a blocking element, which prevents incorrectly cut keys from being fully inserted into the key way 13 of the lock 10. Such a blocking element is disclosed in a patent application being filed by the same applicant on the same day as the earliest priority date of this application (WO2010/096007 A1).

The exact configuration or shape of the longitudinally extending pocket may be modified in various ways within the scope of the present invention. In FIG. 10, there is shown an embodiment where the inner wall [124] *surface 124'* of the longitudinal profile groove [122] *122' of the key blade 120'* merges smoothly with the adjoining *inner* lateral wall [132] *surface 132'* of the *vertically oriented* pocket-like configuration [135,] *135'* just like in FIG. 7. *The external side wall surface 123' is substantially parallel to the inner lateral wall surface 132'.*

In FIG. 11, the pocket-like configuration [135] *135"* is similar to the one in FIG. 7, but [it is slightly wider and] the lowermost transverse end wall [134'] *surface 134"* is rounded or curved. *In addition, FIG. 11 illustrates the undercut portion 129' and the undercut groove 122". Further, the vertical direction (VD) is illustrated in FIG. 11.*

The embodiment shown in FIG. 12 *includes a lower side wall 126' and* is similar to the [one] *embodiment* in FIG. [10] *11*, [but] *and* the lowermost transverse end wall *surface* 134" is curved. The inner wall [124] *surface 124"* of the groove merges smoothly with the adjoining *inner* lateral wall [132] *surface 132". In FIGS. 11 and 12, the lowermost transverse end wall surface 134" of the pocket 135" is curved with a radius being more than half of a width of the pocket 135. The width is measured transversely to the external side wall surface 123 of the one piece key blade 120.*

In FIG. 13, the pocket-like configuration [135'] *1353* is modified into a circular cross-section. Accordingly, in this embodiment, the lateral [walls 132, 133] *wall surfaces 1323, 133'* and the lowermost end wall [134] *surface 1343* are all formed as circular arcs merging with each other.

The embodiment shown in FIG. 14 is like the one shown in FIG. 10, but the *inner* lateral wall [132] *surface 1324* adjoining the inner wall [124] *surface 1243* is provided with a longitudinal recess 132a, which is rectangular in cross-section.

The embodiment of FIG. 15 is similar to the one of FIG. 14, but there is also a longitudinal recess 133a in the *outer* lateral wall [133] *133"* opposite to the longitudinal recess [132a] *132a' in the lateral wall 1325.*

The embodiment in FIG. 16 is similar to the one in FIG. 15, but there is a longitudinal rib 133b (instead of a recess 133a) opposite to the longitudinal recess [132a] *132a".*

The modified embodiment shown in FIG. 17 comprises relatively small longitudinal recesses 132c, 133c, 134c with [part cylindrical] *part-cylindrical* cross-sections in the lateral [walls 133] *wall surfaces 1333* and [132] *1326* and the lowermost end wall [134] *surface 1344*, respectively. Except for these part-circular recesses, this embodiment [is similar] *corresponds* to the one shown in FIG. 11.

The embodiments of FIGS. 14 through 17 are included to illustrate that the opposite lateral wall *surface* portions and the lowermost transverse end wall *surface* of the longitudinal pocket may be provided with irregular surface portions.

Finally, FIGS. 18 through 26 show modified embodiments similar to those shown in FIGS. 10 through 17. Thus, the keys 321 through [328] *329* each have a cross-sectional profile corresponding to those shown in FIGS. 10 through 17, respectively, except that the upper part of the ridge [portion 228 is] *portions 228', 228", 2283, 2284, 2285, 2286, 2287, 2288 and 2289 are* uniformly thick, and the inside [226] *226', 226", 2263, 2264, 2265, 2266, 2267, 2268 and 2269* thereof [is] *are* parallel to the [central] plane of the key blade.

FIG. 26 corresponds to FIGS. 11 and 19, except that the lowermost transverse end wall 234 of the key 329 is flat.

In all embodiments described above, and in the appended claims, it is assumed that the inner wall 124 of the longitudinal undercut groove 122, 122', 122" is substantially parallel to the [central] plane A of the key blade and [a side surface] *the external side wall surfaces* 123, 123', 123" thereof. Within this definition, the inner wall may be oriented at a small angle to said [central] plane A, this angle being normally no more than 15°*, in some cases* (*such as a relatively thick key blade*) *somewhat larger.*

The longitudinally extending pocket may be shorter than the length of key blade and extend along only a portion thereof.

Also, the longitudinal profile rib at the key plug may be interrupted or formed as one or more separate elements mounted in the key plug.

The invention claimed is:

1. A key for use in a cylinder lock with a rotatable key plug having a profiled key way, said key comprising:

an elongated *one piece* key blade [(120)] with a relatively wide lower portion and a relatively narrow upper portion, there being a step-like transition [region] between the wider lower portion and the narrow upper portion, said *one piece* key blade [(120)] having a longitudinal profile groove [(122)] located adjacent to said step-like transition [region] and extending along at least a portion of the length of the *one piece* key blade, with an inner wall [(124)] *surface* of said groove being oriented substantially in parallel [to or at a small angle, no more than 15°,] to [a] *an external* side *wall* surface [(123)] of said lower portion of said *one piece* key blade, said longitudinal profile groove [(122)] having, at a lower part thereof, an undercut portion [(129)] adjacent to and inside a ridge portion [(128)] of the *one piece* key blade, the outside of said ridge portion forming a part of said *external* side *wall* surface [(123)] of said lower portion of the *one piece* key blade, in said relatively wide lower portion up to said step-like transition [region (142)], and [the inside of] said ridge portion [facing] *being opposite* said inner wall *surface* of said *longitudinal profile* groove, said longitudinal profile groove [(122)] defining, at an upper part thereof, a *smallest opening* width (w), *as seen* perpendicularly to said *external* side *wall* surface [(123)] of said lower portion of said *one piece* key blade, between an upper wall [(144)] *surface* and said ridge portion [(128)], wherein*:*

*said undercut portion of said longitudinal profile groove extends downwardly substantially in a vertical direction (VD) in parallel to said external side wall surface of said one piece key blade,* said undercut portion [(129)] of said longitudinal profile groove [(122)], at [its] *an* innermost part [inside said ridge portion (128)], is extended [or expanded downwardly,] *further substantially* in [a] *the same direction as said vertical* direction [which is substantially parallel to said side surface (123) of the key blade,] (*VD*) into a longitudinal *substantially uniformly wide* pocket [(135)] having a uniform width with opposite *inner and outer* substantially parallel lateral wall *surface* portions [(132, 133) and] *wherein said inner wall surface of said longitudinal profile groove adjoins the inner lateral wall surface portion of said pocket, and said inner lateral wall surface portion of said pocket extends downwardly to* a lowermost transverse end wall [(134)] *surface*, which is substantially flat or slightly curved, and which is substantially parallel to a [lower edge portion (127) of the] *lowermost edge wall surface of the one piece* key blade and *which* faces upwardly in a direction [being parallel to central plane (A) of the key blade] *opposite to said vertical direction* (*VD*) towards said upper wall [(144)] *surface* of said longitudinal profile groove [(122)] with said opposite lateral wall *surface* portions [(132, 133)] of said pocket [(135)] being substantially parallel to said *external* side *wall* surface [(123)] of the [flat] *one piece* key blade [(120)].

2. The key as defined in claim 1, wherein [the] *a* vertical dimension (h) of said ridge portion [(128)] is greater than the distance (d) between said lowermost transverse end wall [(134) of said groove] *surface* and said [lower] *lowermost* edge *wall* surface [(127)] of the *one piece* key blade.

[3. The key as defined in claim 1, wherein said pocket (135) has a substantially rectangular cross-section.]

[4. The key as defined in claim 1, wherein said inner wall (124) of said longitudinal profile groove (122) merges with one of said opposite lateral walls portions (132, 133) of said pocket.]

5. The key as defined in claim 1, wherein [the] *a* vertical dimension (h) of said ridge portion [(128)], measured in a plane of said *lower* side *wall* surface [(123)] of the *one piece* key blade [(120)], is more than half of [the] *said* smallest *opening* width (w) of said longitudinal profile groove [(122)] adjacent to said *external* side *wall* surface [(123)], said smallest *opening* width (w) being measured as a perpendicular projection onto said [innerwall (124)] *inner wall surface* of said longitudinal profile groove [(122)].

6. The key as defined in claim 5, wherein said vertical dimension (h) of said ridge portion [(128)] is equal to or greater than said smallest *opening* width (w).

7. The key as defined in claim 1, [constituting] *wherein the one piece key blade is formed from* a key blank with a continuous upper edge portion configured so as to permit coded recesses to be cut therein.

8. The key as defined in claim 1, having coded recesses [(102a . . . 102e)] cut into said ridge portion [(128)], so as to form a side code on the *one piece* key blade, said side code recesses being configured to cooperate with at least one side tumbler [(105)] in an associated lock.

9. The key as defined in claim 8, wherein said side code recesses [(102a . . . 102e)] forming a side code constitute a wave-like, longitudinal code pattern.

10. The key as defined in claim 8, wherein said side code recesses [(102a . . . 102e)] are cut into the whole material thickness of said ridge portion [(128)], so that the side code recesses reach all the way from the [outside] *external side wall* surface [(123)] of said ridge portion [(128)] into said longitudinal pocket [(135)] of the undercut profile groove [(122)], *and the outer lateral wall surface portion of said pocket is interrupted by said side code recesses*.

11. The key as defined in claim 8, wherein said side code recesses [(102a . . 102e)] are cut from an upper edge of the ridge portion [(128)] down to various levels between said upper edge and [the] *a* lowermost part of said longitudinally extending pocket [(135)].

12. The key as defined in claim 8, wherein said side code recesses [(102a . . . 102e)] form concavities with lower bottom portions located at a number of different levels, each representing a code.

13. The key as defined in claim [12] *11*, wherein said [different] *various* levels also include an uppermost level at the upper edge [(102f)] of said ridge portion [(128)].

14. The key as defined in claim [12] *11*, wherein the number of [different] *various* levels is at least three.

15. The key as defined in claim 1, wherein the inner wall [(124)] *surface* of said longitudinal profile groove [and the adjoining longitudinal pocket (135) are] *is* located at a [depth] *distance* from said *external* side *wall* surface [(123)] of the *one piece* key blade [(120)] which is greater than half [the] *a* thickness of said *one piece* key blade.

[16. A key for use in a cylinder lock with a rotatable key plug having a profiled key way, said key comprising:

an elongated key blade (120) with a relatively wide lower portion and a relatively narrow upper portion, there being a step-like transition region between the wider lower portion and the narrow upper portion, said key blade (120) having a longitudinal profile groove (122) located adjacent to said step-like transition region and extending along at least a portion of the length of the key blade, with an inner wall (124) of said groove being oriented substantially in parallel to or at a small angle, no more than 15°, to a side surface (123) of said lower portion of said key blade, said longitudinal profile groove (122) having, at a lower part thereof, an undercut portion (129) adjacent to and inside a ridge portion (128) of the key blade, the outside of said ridge portion forming a part of said side surface (123) of said lower portion of the key blade, in said relatively wide lower portion up to said step-like transition region (142), and the inside of said ridge portion facing said inner wall of said groove, said longitudinal profile groove (122) defining, at an upper part thereof, a width (w), perpendicularly to said side surface (123) of said lower portion of said key blade, between an upper wall (144) and said ridge portion (128), wherein said undercut portion (129) of said longitudinal profile groove (122), at its innermost part inside said ridge portion (128), is extended or expanded downwardly, in a direction which is substantially parallel to said side surface (123) of the key blade, into a longitudinal substantially bulbous pocket (135) having a larger width relative to the longitudinal profile groove (122), said bulbous pocket (135) being formed by opposite lateral wall portions (132, 133) and a lowermost transverse end wall (134) which is slightly curved and faces upwardly in a direction of a central plane (A) of the key blade towards said upper wall (144) of said longitudinal profile groove (122).]

[17. The key as defined in claim 16, wherein the vertical dimension (h) of said ridge portion (128) is greater than the distance (d) between said lowermost transverse end wall (134) of said groove and said lower edge surface (127) of the key blade.]

[18. The key as defined in claim 16, wherein at least one of said opposite lateral wall portions (132, 133) is curved.]

[19. The key as defined in claim 16, wherein said lowermost transverse end wall (134', 134") of said pocket (135) is curved with a radius being more than half of the width of said pocket, said width being measured transversely to said side surface (123) of said key blade (120).]

[20. The key as defined in claim 16, wherein said inner wall (124) of said longitudinal profile groove (122) merges with one of said opposite lateral walls portions (132, 133) of said pocket.]

[21. The key as defined in claim 16, wherein the vertical dimension (h) of said ridge portion (128), measured in a plane of said side surface (123) of the key blade (120), is more than half of the smallest width (w) of said longitudinal profile groove (122) adjacent to said side surface (123), said smallest width (w) being measured as a perpendicular projection onto said inner wall (124) of said longitudinal profile groove (122).]

[22. The key as defined in claim 21, wherein said vertical dimension (h) of said ridge portion (128) is equal to or greater than said smallest width (w).]

[23. The key as defined in claim 16, constituting a key blank with a continuous upper edge portion configured so as to permit coded recesses to be cut therein.]

[24. The key as defined in claim 16, having coded recesses (102a . . . 102e) cut into said ridge portion (128), so as to form a side code on the key blade, said side code recesses being configured to cooperate with at least one side tumbler (105) in an associated lock.]

[25. The key as defined in claim 24, wherein said side code recesses (102a . . . 102e) forming a side code constitute a wave-like, longitudinal code pattern.]

[26. The key as defined in claim 24, wherein said side code recesses (102a . . . 102e) are cut into the whole material thickness of said ridge portion (128), so that the side code recesses reach all the way from the outside surface (123) of said ridge portion (128) into said longitudinal pocket (135) of the undercut profile groove (122).]

[27. The key as defined in claim 24, wherein said side code recesses (102a . . . 102e) are cut from an upper edge of the ridge portion (128) down to various levels between said upper edge and the lowermost part of said longitudinally extending pocket (135).]

[28. The key as defined in claim 24, wherein said side code recesses (102a . . . 102e) form concavities with lower bottom portions located at a number of different levels, each representing a code.]

[29. The key as defined in claim 28, wherein said different levels also include an uppermost level at the upper edge (1020 of said ridge portion (128).]

[30. The key as defined in claim 28, wherein the number of different levels is at least three.]

[31. The key as defined in claim 16, wherein the inner wall (124) of said longitudinal profile groove and the adjoining longitudinal pocket (135) are located at a depth from said side surface (123) of the key blade (120) which is greater than half the thickness of said key blade.]

32. A key for use in a cylinder lock with a rotatable key plug having a profiled key way, said key comprising:

an elongated *one piece* key blade [(120)] with a relatively wide lower portion and a relatively narrow upper portion, there being a step-like transition [region] between the wider lower portion and the narrow upper portion, said *one piece* key blade [(120)] having a longitudinal profile groove [(122)] located adjacent to said step-like transition [region] and extending along at least a portion of the length of the *one piece* key blade, with an inner wall [(124)] *surface* of said groove being [oriented substantially in parallel to or at a small angle, no more than 15°, to a side] *substantially parallel to an external side wall* surface [(123)] of said lower portion of said *one piece* key blade, said longitudinal profile groove [(122)] having, at a lower part thereof, an undercut portion [(129)] adjacent to and inside a ridge portion [(128)] of the *one piece* key blade, the outside of said ridge portion forming a part of said *external* side *wall* surface [(123) of said lower portion] of the *one piece* key blade, in said relatively wide lower portion up to said step-like transition [region (142), and the inside of] *and* said ridge portion [facing] *being opposite to* said inner wall *surface* of said *longitudinal profile* groove, said longitudinal profile groove [(122)] defining, at an upper part thereof, a *smallest opening* width (w), *as seen* perpendicularly to said *external* side *wall* surface [(123)] of [said lower portion of] said *one piece* key blade, between an upper wall [(144)] *surface* and said ridge portion [(128)], wherein*:*

*said undercut portion of said longitudinal profile groove extends downwardly substantially in a vertical direction (VD) in parallel to said external side wall surface of said one piece key blade,* said undercut portion [(129)] of said longitudinal profile groove [(122)], at [its] *an* innermost part [inside said ridge portion (128), is extended or expanded downwardly,] *is extended further substantially* in [a] *the same direction as said vertical* direction [which is substantially parallel to said side surface (123) of the key blade,] (*VD*) into a longitudinal pocket [(135) having] *being interrupted* at least one longitudinal recess formed in at least one of [the] opposite *inner and outer* lateral wall *surface* portions [(132, 133) and] *wherein said inner wall surface of said longitudinal profile groove adjoins said inner lateral wall surface portion, located opposite to said ridge portion, and said inner lateral wall surface portion extends downwardly to* a lowermost transverse end wall [(134)] *surface*, said lowermost transverse end wall [(134)] *surface* being substantially flat or slightly curved, and being substantially parallel to a [lower edge portion (127) of the] *lowermost edge wall surface of the one piece* key blade and *which* faces upwardly in a direction [being parallel to central plane (A) of the key blade] *opposite to said vertical direction* (*VD*) towards said upper wall [(144)] *surface* of said longitudinal profile groove [(122)] with said opposite lateral wall *surface* portions [(132, 133)] of said pocket [(135)] being substantially parallel to said *external* side *wall* surface [(123)] of the [flat] *one piece* key blade [(120)].

33. The key as defined in claim 32, wherein [the] *a* vertical dimension (h) of said ridge portion [(128)] is greater than the distance (d) between said lowermost transverse end wall [(134)] *surface* of said groove and said [lower] *lowermost* edge *wall* surface [(127)] of the *one piece* key blade.

[34. The key as defined in claim 32, wherein at least one of said opposite lateral wall portions (132, 133) is curved.]

[35. The key as defined in claim 32, wherein said lowermost transverse end wall (134', 134") of said pocket (135) is curved with a radius being more than half of the width of said pocket, said width being measured transversely to said side surface (123) of said key blade (120).]

36. The key as defined in claim 32, wherein said at least one *of said* longitudinal recess formed in at least one of the opposite lateral wall *surface* portions [(132)] and said lowermost transverse end wall [(134)] *surface* is provided with an irregular surface portion [(132c, 134c)].

[37. The key as defined in claim 32, wherein said inner wall (124) of said longitudinal profile groove (122) merges with one of said opposite lateral walls portions (132, 133) of said pocket.]

38. The key as defined in claim 32, wherein [the] *a* vertical dimension (h) of said ridge portion [(128)], measured in [a] *said* plane of said *external* side *wall* surface [(123)] of the *one piece* key blade [(120)], is more than half of [the smallest] *said smallest opening* width (w) of said longitudinal profile groove [(122)] adjacent to said *lower* side *wall* surface [(123)], said smallest *opening* width (w) being measured as a perpendicular projection onto said inner wall [(124)] *surface* of said longitudinal profile groove [(122)].

39. The key as defined in claim 38, wherein said vertical dimension (h) of said ridge portion [(128)] is equal to or greater than said smallest *opening* width (w).

40. The key as defined in claim 32, [constituting] *wherein the one piece key blade is formed from* a key blank with a continuous upper edge portion configured so as to permit coded recesses to be cut therein.

41. The key as defined in claim 32, having coded recesses [(102a . . . 102e)] cut into said ridge portion [(128)], so as to form a side code on the *one piece* key blade, said side code recesses being configured to cooperate with at least one side tumbler [(105)] in an associated lock.

42. The key as defined in claim 41, wherein said side code recesses [(102a . . 102e)] forming a side code constitute a wave-like, longitudinal code pattern.

43. The key as defined in claim 41, wherein said side code recesses [(102a . . . 102e)] are cut into the whole material thickness of said ridge portion [(128)], so that the side code recesses reach all the way from the [outside] *external side wall* surface [(123)] of said ridge portion [(128)] into said longitudinal pocket [(135)] of the undercut profile groove [(122)].

44. The key as defined in claim 41, wherein said side code recesses [(102a . . . 102e)] are cut from an upper edge of the ridge portion [(128)] down to various levels between said upper edge and the lowermost part of said longitudinally extending pocket [(135)].

45. The key as defined in claim 41, wherein said side code recesses [(102a . . . 102e)] form concavities with lower bottom portions located at a number of different levels, each representing a code.

46. The key as defined in claim [45] *44*, wherein said [different] *various* levels also include an uppermost level at the upper edge [(102f)] of said ridge portion [(128)].

47. The key as defined in claim [45] *44*, wherein the number of [different] *various* levels is at least three.

48. The key as defined in claim 32, wherein the inner wall [(124)] *surface* of said longitudinal profile groove [and the adjoining longitudinal pocket (135) are] *is* located at a [depth from said side] *distance from said external side wall* surface [(123)] of the *one piece* key blade [(120)] which is greater than half [the] *a* thickness of said *one piece* key blade.

* * * * *